United States Patent
Elmasry et al.

(10) Patent No.: US 11,304,061 B2
(45) Date of Patent: Apr. 12, 2022

(54) SYSTEM AND METHOD FOR SPECTRUM SITUATIONAL AWARENESS VIA SERVER-BASED FUSION IN A COMMAND AND CONTROL (C2) LINK SYSTEM FOR UNMANNED AIRCRAFT SYSTEMS (UAS)

(71) Applicant: Rockwell Collins, Inc., Cedar Rapids, IA (US)

(72) Inventors: George F. Elmasry, San Marcos, CA (US); Boe A. Svatek, Cedar Rapids, IA (US); George Tyler Barney, North Liberty, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/024,309

(22) Filed: Sep. 17, 2020

(65) Prior Publication Data

US 2022/0086652 A1 Mar. 17, 2022

Related U.S. Application Data

(63) Continuation-in-part of application No. 17/018,019, filed on Sep. 11, 2020.

(51) Int. Cl.
*H04W 16/14* (2009.01)
*G01S 7/02* (2006.01)
(Continued)

(52) U.S. Cl.
CPC ............. *H04W 16/14* (2013.01); *G01S 7/021* (2013.01); *G01S 7/023* (2013.01); *G08G 5/0013* (2013.01); *G08G 5/0069* (2013.01); *H04W 16/10* (2013.01)

(58) Field of Classification Search
CPC ....... H04W 16/14; H04W 16/10; G01S 7/021; G01S 7/023; G08G 5/0013; G08G 5/0069
See application file for complete search history.

(56) References Cited

U.S. PATENT DOCUMENTS

| 5,123,112 A | 6/1992 | Choate |
| 5,212,804 A | 5/1993 | Choate |

(Continued)

FOREIGN PATENT DOCUMENTS

| CN | 103209037 B | 4/2015 |
| CN | 109889288 A | 6/2019 |

(Continued)

OTHER PUBLICATIONS https://newjerseywireless.org/feed-rss/ericsson-calls-out-dynamic-spectrum-sharing-as-key-to-nationwide-5g-coverage/, "Ericsson calls out dynamic spectrum sharing as key to nationwide 5G coverage", Ericsson, First Printed Aug. 5, 2020, 5 pages.

(Continued)

*Primary Examiner* — Dinh Nguyen
(74) *Attorney, Agent, or Firm* — Suiter Swantz pc llo

(57) ABSTRACT

A centralized spectrum arbitrator for a command and control (C2) link system is disclosed. In embodiments, the spectrum arbitrator receives sensor fusion data from the air radio systems (ARS) and ground radio systems (GRS) of the C2 link system, each dataset comprising mean energy levels for a particular frequency and location. The spectrum arbitrator determines a time average of the energy levels and evaluates interference with the frequency at the location (e.g., whether the interference is tolerable or the frequency should not be used) and attempts to classify interfering signals (e.g., as radar, malicious, of the C2 link system or competing). The spectrum arbitrator may further fuse sensor fused data into additional spectrum situational awareness (SA) outputs (Continued)

illustrating or recommending opportunistic frequency use or reuse across the C2 link system.

15 Claims, 9 Drawing Sheets

(51) Int. Cl.
  *H04W 16/10* (2009.01)
  *G08G 5/00* (2006.01)

(56) References Cited

U.S. PATENT DOCUMENTS

| | | |
|---|---|---|
| 7,979,200 B2 | 7/2011 | Bay et al. |
| 8,451,751 B2 | 5/2013 | Challapali et al. |
| 8,494,546 B2 | 7/2013 | Hu |
| 8,654,771 B1 | 2/2014 | Singh et al. |
| 8,976,762 B2 | 3/2015 | Vlantis et al. |
| 9,237,043 B1 | 1/2016 | Beals et al. |
| 9,326,291 B2 | 4/2016 | Luo et al. |
| 9,648,589 B2 | 5/2017 | Weaver et al. |
| 9,872,182 B2 | 1/2018 | Smith et al. |
| 9,986,440 B2 | 5/2018 | Guvenc |
| 10,264,463 B2 | 4/2019 | McHenry et al. |
| 10,477,549 B2 | 11/2019 | Watts |
| 10,645,627 B2 | 5/2020 | Abdul et al. |
| 2012/0120892 A1 | 5/2012 | Freda et al. |
| 2012/0134328 A1 | 5/2012 | Gauvreau et al. |
| 2017/0055179 A1 | 2/2017 | Radunovic et al. |
| 2017/0215178 A1 | 7/2017 | Kim et al. |
| 2017/0215220 A1 | 7/2017 | Kim et al. |
| 2017/0325221 A1 | 11/2017 | Jalali |
| 2018/0160433 A1 | 6/2018 | Kim et al. |
| 2019/0054937 A1 | 2/2019 | Graetz et al. |
| 2019/0230671 A1 | 7/2019 | Kim et al. |
| 2020/0120458 A1 | 4/2020 | Aldana et al. |
| 2020/0187013 A1 | 6/2020 | Mody et al. |
| 2020/0245167 A1 | 7/2020 | Kleinbeck et al. |

FOREIGN PATENT DOCUMENTS

| | | |
|---|---|---|
| CN | 110392350 A | 10/2019 |
| CN | 110602758 A | 12/2019 |
| EP | 2837223 A4 | 1/2016 |
| GB | 2461724 B | 2/2011 |
| KR | 1020150095008 A | 8/2015 |
| KR | 1020170105559 A | 9/2017 |
| KR | 101836480 B1 | 3/2018 |
| KR | 101949709 B1 | 2/2019 |

OTHER PUBLICATIONS

Lin, Y. et al., "Dynamic Spectrum Interaction of UAV Flight Formation Communication with Priority: A Deep Reinforcement Learning Approach," in IEEE Transactions on Cognitive Communications and Networking, doi: 10.1109/TCCN.2020.2973376, Downloaded Feb. 14, 2020, 12 pages.

U.S. Appl. No. 17/018,019, filed Sep. 11, 2020, entitled System and Method for Adaptiveextension of Command and Control (C2) Backhaul Network Forunmanned Aircraft Systems (UAS).

U.S. Appl. No. 17/024,266, filed Sep. 17, 2020, entitled System and Method for Generating Control and Non-Payload Communication (CNPC) Congestion Metrics at a Ground Control Station.

U.S. Appl. No. 17/024,279, filed Sep. 17, 2020, entitled System and Method for Same-Channel Out-Of-Band Spectrum Sensing for Command and Control (C2) Communications to Unmanned Aircraft Systems (UAS).

US 11,304,061 B2

SYSTEM AND METHOD FOR SPECTRUM SITUATIONAL AWARENESS VIA SERVER-BASED FUSION IN A COMMAND AND CONTROL (C2) LINK SYSTEM FOR UNMANNED AIRCRAFT SYSTEMS (UAS)

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

Concurrently filed U.S. Patent Application entitled SYSTEM AND METHOD FOR SAME-CHANNEL OUT-OF-BAND SPECTRUM SENSING FOR COMMAND AND CONTROL (C2) COMMUNICATIONS TO UNMANNED AIRCRAFT SYSTEMS (UAS), having application Ser. No. 17/024,279,
Concurrently filed U.S. Patent Application entitled SYSTEM AND METHOD FOR GENERATING CONTROL AND NON-PAYLOAD COMMUNICATION (CNPC) CONGESTION METRICS AT A GROUND CONTROL STATION, having application Ser. No. 17/024,266;
and U.S. Patent Application entitled SYSTEM AND METHOD FOR ADAPTIVE EXTENSION OF COMMAND AND CONTROL (C2) BACKHAUL NETWORK FOR UNMANNED AIRCRAFT SYSTEMS (UAS), having application Ser. No. 17/018,019, filed Sep. 11, 2020.
Said U.S. patent application Ser. Nos. 17/024,279, 17/024,266, and 17/018,019 are herein incorporated by reference in their entirety.

BACKGROUND

Traffic and operations management for unmanned aircraft systems (UAS; also unmanned aerial vehicles (UAV)) may be achieved by private wireless networks (e.g., command and control (C2) backhaul networks) using specialized control and non-payload communications (CNPC) waveforms over aviation spectrum bands. For example, airborne UAS may carry onboard CNPC-based air radio systems (ARS) while ground-based control facilities maintain CNPC-based ground radio stations (GRS). A GRS may establish point-to-multipoint links to multiple ARS (e.g., multiple ARS operating within a coverage area dedicated to the GRS or within its transmission range) based on spectrum resources (e.g., bandwidth) assigned to the GRS. For example, the GRS may maintain secure two-way C2 links to each ARS operating within its coverage area, via which the GRS may maintain spatial separation between ARS or prevent an ARS from entering dangerous or geofenced areas via control input submitted via the C2 link to the ARS operator or directly to the ARS itself. However, careless spectrum reuse may lead to self-interference (e.g., where a CNPC signal is interfered with by another CNPC signal from within the same C2 link system, as opposed to external interference, where a competing C2 link system (e.g., a C2 link system using a non-CNPC waveform) may be operating on the same frequency within the same vicinity).

A significant challenge to the C2 link system is that the aviation spectrum must be shared with parallel and/or competing C2 link systems. It is expected by the Federal Aviation Administration (FAA) and/or other relevant regulatory bodies that the aviation spectrum can be shared gracefully by all C2 service providers. This may be achieved, for example, via a centralized server (e.g., spectrum arbitrator) maintaining a "bird's eye view" of the C2 link system by monitoring spectrum use by each component ARS/GRS and managing frequency allocations to maximize system capacity. However, the centralized spectrum arbitrator must be able to understand and respond to what each component ARS/GRS is reporting with respect to spectrum use.

SUMMARY

A centralized spectrum arbitrator (e.g., central server) for a command and control (C2) communications link system is disclosed. In embodiments, the centralized spectrum arbitrator includes transceivers for receiving sensor fusion data from within the C2 link system, the sensor fusion data associated with a sensed mean energy level at an assigned sensing frequency local to the sensor. The spectrum arbitrator includes control processors for determining a time average of the mean energy level as values are received. Based on the time average of the mean energy level compared to one or more energy thresholds, the spectrum arbitrator evaluates local interference (relative to the sensor) on the assigned sensed frequency. The spectrum arbitrator attempts to identify and classify signal information (e.g., whether the local interference is caused by an interfering signal) based on the mean energy level and the time average. The spectrum arbitrator generates additional server fusion situational awareness (SA) output based on the time average and mean energy level.

In some embodiments, the local sensor is based in an air radio system (ARS) aboard an unmanned aircraft system, or based in a ground radio station (GRS).

In some embodiments, the sensor fusion data received from the local sensor includes a standard deviation from the mean energy level, a minimum energy level (e.g., noise floor), and a standard deviation from the minimum energy level.

In some embodiments, the interference evaluation includes one or more of: 1) determining that the interference on the sensed frequency is associated with an acceptable level of background noise, if the time average of the mean energy level deceeds a low energy threshold; 2) determining that the interference is associated with an interfering signal of acceptable strength, e.g., not strong enough to preclude local use of the sensed frequency, if the time average exceeds the low threshold but deceeds an acceptable energy threshold above the low threshold; and 3) determining, if the time average exceeds the acceptable energy threshold, that the level of interference precludes local use of the sensed frequency.

In some embodiments, classification of signal information includes one or more of: 1) determining that the interfering signal is a radar signal; 2) determining that the interfering signal is a malicious signal; 3) determining a direction of the interfering signal; 4) determining an origin of the interfering signal; 5) determining that the interfering signal is associated with the C2 link system; and 6) determining that the interfering signal is associated with a competing C2 link system using different waveforms.

In some embodiments, the additional server fusion situational awareness (SA) output including identifying fairness rule violations on the part of the C2 link system or the competing C2 link system.

In some embodiments, the additional server fusion situational awareness (SA) output includes identifying additional frequencies to be sensed or probed by local sensors.

In some embodiments, the additional server fusion situational awareness (SA) output includes an interactive display device for presenting fused server fusion SA output to a human operator, who can provide control input via the display device based on the presented SA output.

In some embodiments, the additional server fusion situational awareness (SA) output includes a heatmap, e.g., a graphical representation of the use of the sensed frequency across multiple local sensors.

In some embodiments, the assigned sensed frequency includes a frequency sub-band.

In some embodiments, the additional server fusion situational awareness (SA) output includes dynamic spectrum access (DSA) operations.

In some embodiments, the DSA operations include directing an ARS of the C2 link system to terminate its C2 link with a current GRS and establish a new C2 link to a different GRS.

In some embodiments, the DSA operations include a spectrum reuse reallocation of available frequencies among the GRS and related coverage areas of the C2 link system.

In some embodiments, the spectrum reuse allocation includes allocating a shared operating frequency among a first GRS having a first coverage area and a second GRS having a second coverage area, where the first and second coverage areas are second neighbors, e.g., share a common neighboring coverage area adjacent to both coverage areas.

In some embodiments, the spectrum reuse reallocation provides for use of the shared frequency by the first GRS in a first time slot and/or in a first direction or sector, and by the second GRS in a second time slot and/or in a second direction or non-adjacent sector.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
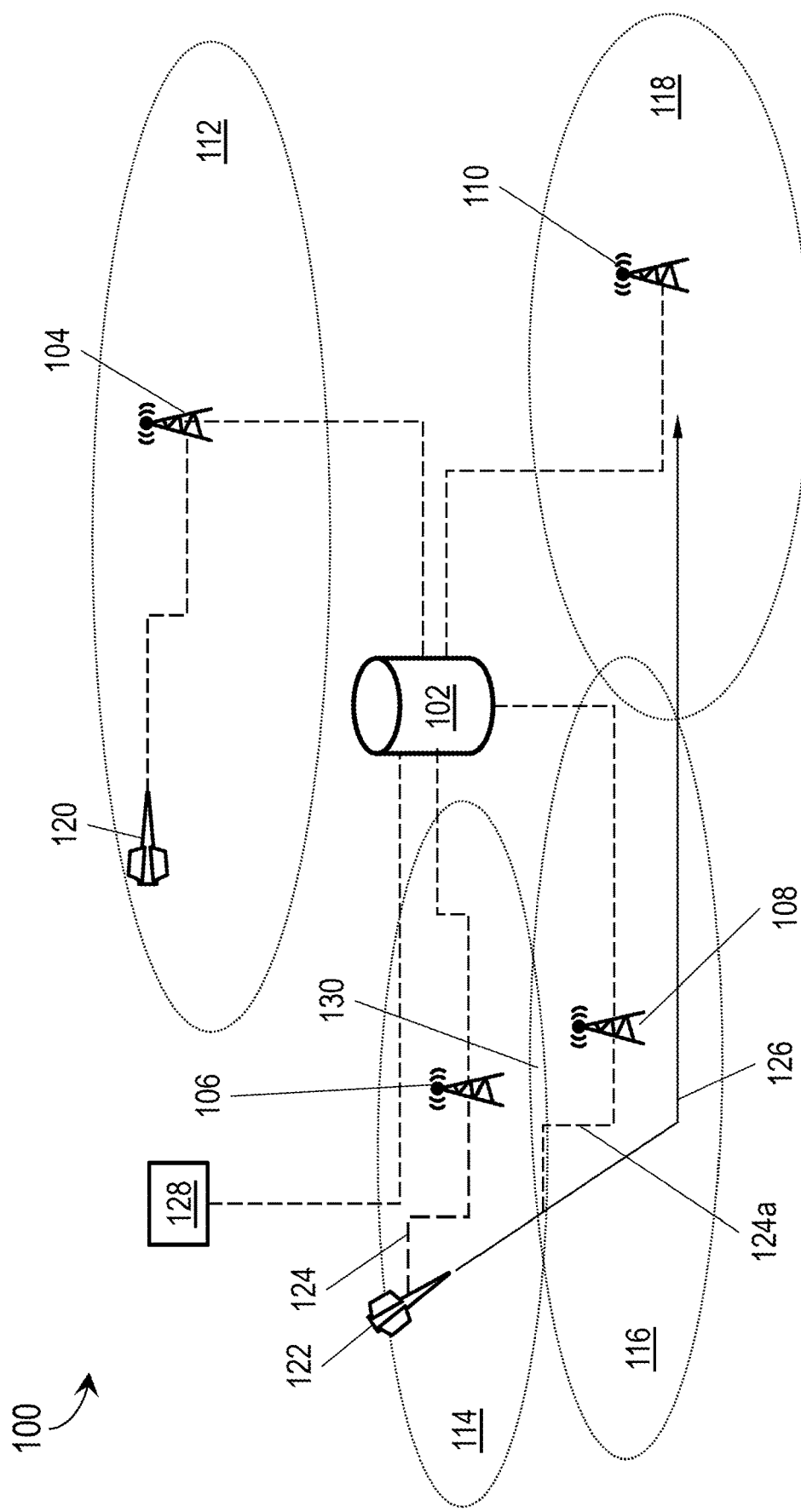
FIG. 1 is a diagrammatic illustration of a command and control (C2) link system (e.g., an unmanned aircraft system (UAS) operating environment) according to with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to intelligent, centralized spectrum situational awareness (SA) and dynamic spectrum access (DSA) operations throughout a command and control (C2) link system. For example, the C2 link system may include a C2 backhaul network comprising unmanned aircraft systems (UAS) operating within the C2 link system and ground-based control stations for managing UAS traffic throughout the network, the ground-based control stations communicating with operating UAS via control and non-payload communications (CNPC) over aviation frequency bands. Previously filed disclosure 127623US01 and concurrently filed disclosure 127773US01, which are herein incorporated by reference in their entirety, respectively disclose the determination of congestion metrics for ground-based stations and the analysis of additional frequencies outside the normal operating frequencies via sensor fusion operations carried out by operating aircraft and ground-based stations throughout the C2 link system. The centralized spectrum arbitrator/central server can further fuse congestion and frequency data received from air-based and ground-based components of the C2 link system to maximize the capacity of the C2 link system via DSA operations. For example, the central server can assess sharing of the C2 spectrum with competing service providers and link systems, whether a friendly or competing link system is violating fairness rules, and the best approaches for opportunistic spectrum reuse.

Referring now to FIG. 1, a C2 link system 100 (e.g., UAS operating environment) is disclosed. The C2 link system 100 may include central server 102 (e.g., centralized spectrum arbitrator); ground radio systems 104, 106, 108, 110 (GRS) respectively serving coverage areas 112, 114, 116, 118; air radio systems 120, 122 (ARS) embodied in unmanned aircraft systems (UAS).

In embodiments, each ARS 120, 122 may maintain a C2 link 124 to a GRS 104, 106 while operating within the coverage area 112, 114 served by that GRS. For example, while the ARS 122 operates within the coverage area 114, the controlling GRS 106 may exchange control and non-payload communications (CNPC) waveform communications with the ARS 122, monitoring the progress of the ARS along its predetermined flight plan 126 and advising the remote operator of the ARS of potential changes to flight plan (e.g., if the ARS must be diverted from a geofenced area) or issuing control input directly to the UAS via the ARS (e.g., if the remote operator is indisposed). In some embodiments, operations of the central server 102 may be managed by a human in the loop 128 (HITL; e.g., a human operator capable of reviewing SA server fusion outputs and providing control input to the central server); in some embodiments the central server 102 may be trained according to machine learning techniques to operate with partial or full autonomy with respect to server fusion, situational awareness (SA), and/or dynamic spectrum access (DSA) operations disclosed herein.

In embodiments, when the flight plan 126 of the ARS 122 directs the embodying UAS into a new or adjacent coverage area 116, the ARS may execute a "switchover", e.g., establishing a new C2 link 124a to the GRS 108 serving the new coverage area 116 and terminating the old C2 link 124 to the GRS 106 serving the prior coverage area 114. For example, the ARS 122 may monitor other frequencies, "listening" to other GRS while maintaining the C2 link 124 to the GRS 106. If the coverage areas 114, 116 overlap, creating an overlap region 130 where CNPC signals from both GRS 106, 108 may be strong enough to support a robust C2 link, the flight plan 126 may provide for a switchover to the GRS 108 within the overlap area.

In embodiments, each GRS 104, 106, 108, 110 and ARS 120, 122 operating within the C2 link system may provide sensor fusion data to the central server 102. For example, each GRS 104, 106, 108, 110 may periodically assess spectrum usage based on the number of operating ARS 120, 122 simultaneously maintaining C2 links 124, determining whether each GRS may be oversubscribed or undersubscribed. Further, each GRS 104, 106, 108, 110 and ARS 120, 122 may be assigned additional frequencies (e.g., other than frequencies supporting a C2 link 124) by the central server 102, in order to determine the viability of frequency use or reuse within the vicinity of a given ARS or GRS. The central server 102 may receive sensor fusion data from each GRS 104, 106, 108, 110 and, via the network of GRS, sensor fusion data from each ARS 120, 122 linked to a given GRS.

In embodiments, the central server 102 may perform additional server fusion based on received sensor fusion data in order to characterize and classify, for example, whether interference on a particular frequency in a particular location is due to acceptable background noise or represents an interfering signal (which may or may not be a CNPC signal, and may or may not be robust enough to preclude local use of that frequency). In some embodiments, server fusion operations may be able to further classify the interfering signal, e.g., by type or origin. In some embodiments, server fusion operations may provide the HITL 128 with additional information about current spectrum use and recommendations for DSA operations to maximize capacity throughout the C2 link system 100. For example, the central server 102 may perform DSA operations to relieve congested GRS 104-110, or utilize directional or sectored antenna elements to more efficiently allocate limited spectrum resources.

Figure 2:
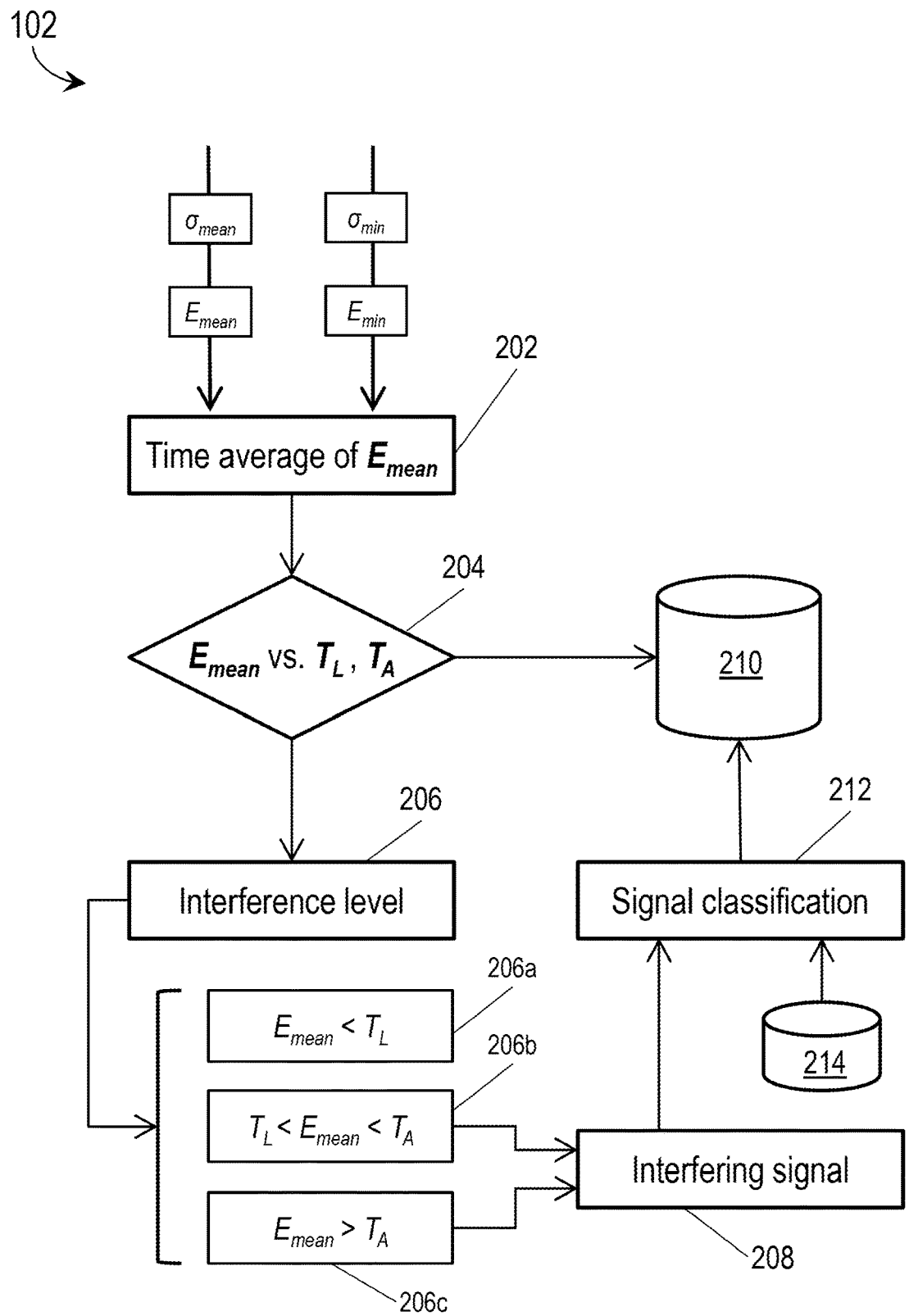
FIG. 2 is a diagrammatic illustration of spectrum situational awareness (SA) operations of a centralized spectrum arbitrator (e.g., central server) of the C2 link system of FIG. 1.

Referring now to FIG. 2, server fusion operations of the central server 102 are disclosed.

In embodiments, each ARS (FIG. 1: 120, 122) and GRS (FIG. 1: 104-110) within the C2 link system (FIG. 1:100) may collect spectral energy samples at a specific frequency (e.g., assigned by the central server) specific to the vicinity of the GRS or ARS (e.g., an ARS in motion may produce different location information than a static GRS). For example, for each sensed frequency assigned, the ARS 120/122 or GRS 104-110 may fuse the collected energy samples locally (e.g., at the ARS or GRS) based on samples collected locally from its own sensor to determine, e.g., a minimum energy level ($E_{min}$; e.g., noise floor); a mean energy level ($E_{mean}$); and standard deviations $\sigma_{min}$ and $\sigma_{mean}$ of, respectively, $E_{min}$ and $E_{mean}$. For example, the energy samples may be collected over a time window N (e.g., one second); accordingly, the central server may receive from each sensed frequency each of the four values $E_{min}$, $E_{mean}$, $\sigma_{min}$, $\sigma_{mean}$ per second. Server fusion operations performed by the central server 102 may glean additional information from individual sensor fusion data not otherwise feasible for execution by onboard sensors (e.g., size, weight and power (SWaP) considerations may preclude the installation of more sophisticated hardware-based sensors (e.g., capable of calculation of cyclostationary characteristics or signal demodulation) aboard a UAS, and integration of hardware-based sensors into a GRS may complicate future refinements or upgrades to the GRS).

In embodiments, for each assigned frequency and for each individual sensor (e.g., each ARS 120, 122/GRS 104-110), the central server 102 may first determine a time average of $E_{mean}$ (202) and compare the determined time average to one or more energy thresholds (204) to assess the interference level (206) for that frequency at that location. For example, the time average (202) may involve plotting $E_{mean}$ over multiple time periods to more clearly illustrate the magnitude (e.g., according to three particular cases as outlined below) and/or the origin of energy that might interfere with a CNPC signal at that frequency. CNPC waveforms provide for a robust signal capable of operation over a certain amount of background noise. In some embodiments, additional server fusion operations may be performed based on time averages of, e.g., $E_{min}$, $\sigma_{min}$, and/or $\sigma_{mean}$.

In embodiments, the low threshold $T_L$ may represent a low energy threshold; if, for example, $E_{mean} < T_L$ (206a), $E_{mean}$ may constitute an acceptable level of ambient or background noise that would not preclude use of the assigned frequency at the given location. In a second case (206b), $T_A$ may be an acceptable energy threshold higher than $T_L$ but not high enough to affect CNPC signal link closure, as CNPC link margin requirements may still be met; e.g., if $T_L < E_{mean} < T_A$ an interfering signal (208) may be detected, but the interfering signal may still not be strong enough to preclude use of the assigned frequency at the given location. Finally, in a third case (206c), if $E_{mean} > T_A$, the interfering signal 208 may be deemed strong enough to preclude use of the assigned frequency at the given location.

In embodiments, spectrum sensing data 210 collected via sensor fusion operations (e.g., $E_{min}$, $E_{mean}$, $\sigma_{min}$, $\sigma_{mean}$ by frequency and location) may be stored for further server fusion operations. For example, the collected sensor fusion data may be stored after filtering to remove background noise.

In embodiments, the central server 102 may further attempt to classify (212) the interfering signal 208. For example, the central server 102 may have access to geolocation data 214 comprising, e.g., the locations of all GRS 104-110 of the C2 link system 100 (and maybe other GRS of competing C2 link systems); the flight paths (FIG. 1: 124), directional signal patterns, and/or trajectories of all ARS 120, 122 of the C2 link system (and maybe other ARS/UAS from competing C2 link systems). Based on the geolocation data 214 and analysis of the time average of $E_{mean}$ (202), the central server 102 may further classify the interfering signal 208 as, e.g., a radar signal, a malicious signal, or a signal associated with a C2 link system (e.g., either the C2 link system 100 or a competing C2 link system incorporating non-CNPC waveforms).

Figure 3A:
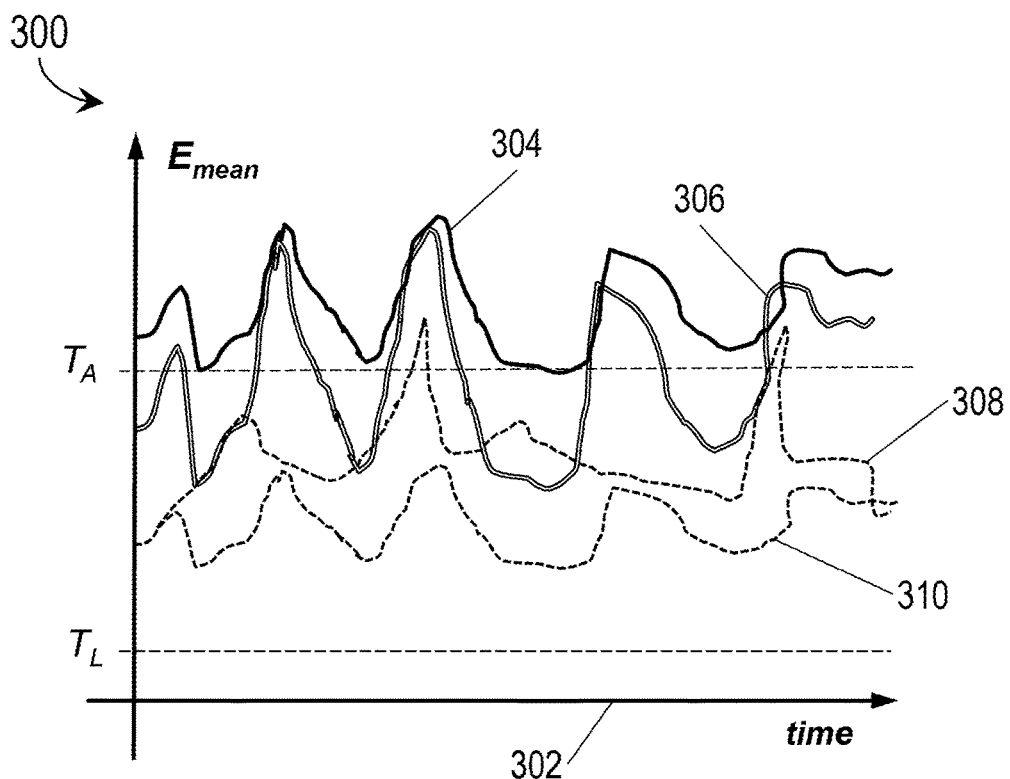
FIGS. 3A and 3B are graphical representations of signal classification operations of the centralized spectrum arbitrator of FIG. 2.

Referring to FIG. 3A, the graph 300 plots the time average of $E_{mean}$ (202) over time (302), as compared to the low energy threshold $T_L$ and the acceptable energy threshold $T_A$.

In embodiments, as disclosed above, the central server (102, FIG. 2) may plot the time average of $E_{mean}$ as multiple data points over an extended period of time (302). For example, based on the curves 304, 306 corresponding to plots of $E_{mean}$ and remaining above $T_A$ for extended periods of time, the central server 102 may conclude that the curves 304, 306 correspond to mean energy levels $E_{mean}$ above the acceptable energy threshold $T_A$ and thus precluding use of their corresponding assigned frequencies at the corresponding locations. However, the curves 308, 310 corresponding to plots of $E_{mean}$ may not remain above $T_A$ for sustained periods of time and thus may be classified by the central server 102 as corresponding to interfering signals (FIG. 2: 208) not strong enough to preclude use of the corresponding assigned frequencies at the corresponding locations.

Figure 3B:
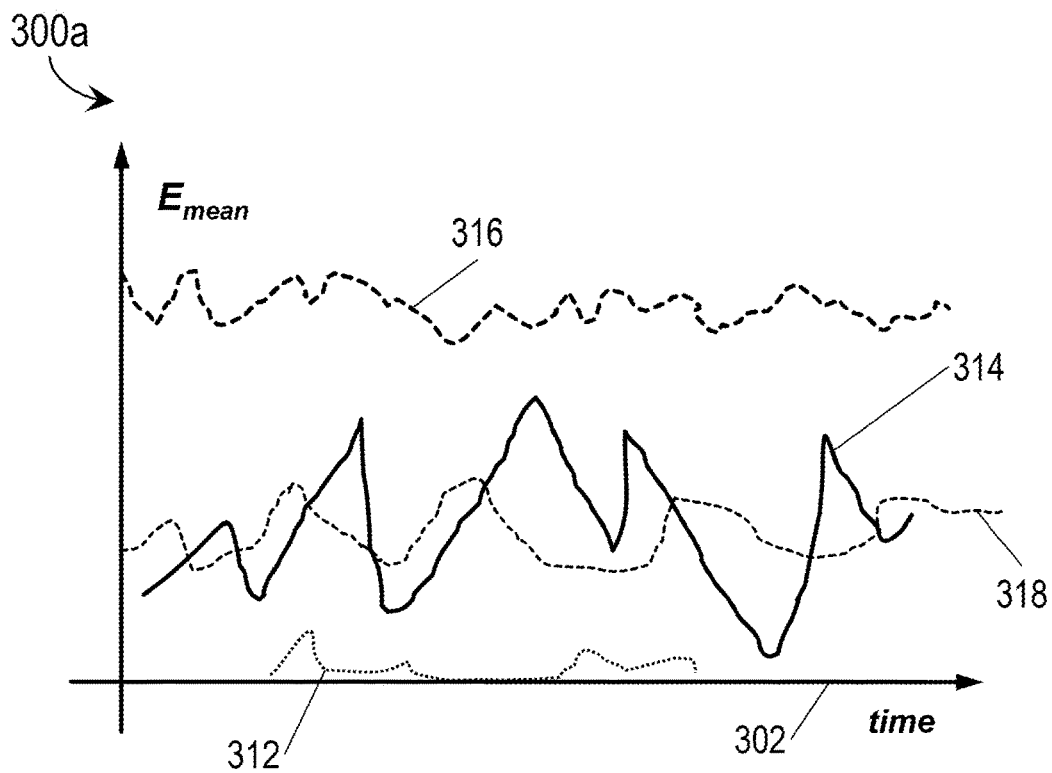

Referring to FIG. 3B, the graph 300a may be implemented and may function similarly to the graph 300 of FIG. 3A, except that the graph 300a may plot further time averaging of $E_{mean}$ over time (302) in order to show patterns corresponding to the interfering signal 208 over time, by which the patterns the central server 102 may make further classifications of the interfering signal.

In embodiments, the central server 102 may compare curves (304-310) corresponding to the time average of $E_{mean}$ (202) of the interfering signal 208 over time 302 (or, e.g., corresponding to other sensor fusion data elements or datasets) to established patterns (e.g., stored to memory by the central server) corresponding to known signal types. For example, ambient noise or low-impact background noise may be associated with a low-intensity energy pattern (312). An energy pattern 314 characterized by high fluctuation in $E_{mean}$ over time and significant standard deviations (e.g., $\sigma_{mean}$) may indicate a malicious signal. An energy pattern 316 having a consistently high energy level and a large footprint (e.g., detectable across multiple locations) may indicate a radar signal. An energy pattern 318 similar to a CNPC signal (see, e.g., curves 304-310, FIG. 3A) may indicate a CNPC signal of the C2 link system 100 or a competing signal associated with another C2 link system.

Figure 4:
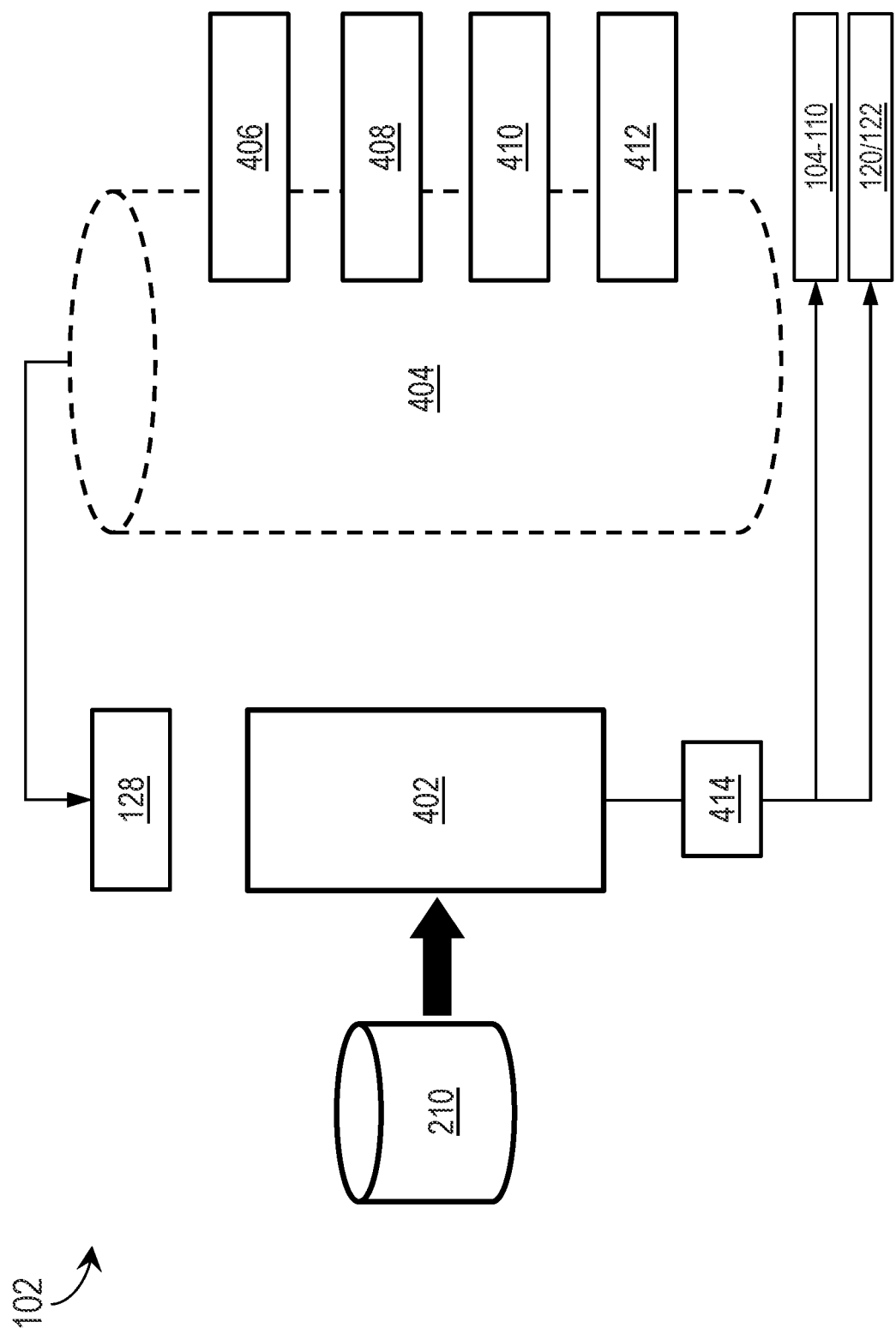
FIG. 4 is a diagrammatic illustration of server fusion operations of the centralized spectrum arbitrator of FIG. 2.

Referring to FIG. 4, the central server 102 is disclosed. The central server may include a fusion engine 402.

In embodiments, the fusion engine 402 may generate additional C2 server fusion outputs 404 (e.g., DSA decisions and/or spectrum reuse recommendations) based on the raw spectrum sensing data 210. For example, the fusion engine 402 may comprise encoded instructions configured for execution on the control processors of the central server 102, fusing the raw spectrum sensing data 210 into additional representations for use by the human in the loop (FIG. 1: 128) or by the central server itself.

In embodiments, the additional C2 server fusion outputs 404 may include reports 406 indicating whether the C2 link system (FIG. 1: 100) and/or competing C2 link systems have violated fairness rules or other applicable regulations. For example, as multiple C2 service providers (and corresponding C2 link systems) may be required to share a finite amount of spectrum resources, commonly observed rules may be established for resource sharing among C2 providers and link systems. In addition, C2 server fusion outputs 404 may include alerts or alarms (408) depending upon, e.g., whether the rule violation/s is/are minor or major.

In embodiments, C2 server fusion outputs 404 may include heatmaps 410 or other like graphical representations of a particular frequency (e.g., "a frequency" may indicate a frequency sub-band), showing use of the frequency or sub-band across one or more locations. In embodiments, C2 server fusion outputs 404 may include spectrum reuse plans 412 providing for opportunistic use or reuse of spectrum resources across the C2 link system 100 and its component ARS/GRS. In some embodiments, C2 server fusion outputs 404 may include dynamic reconfigurations 414 of sensors of the C2 link system 100, e.g., one or more component GRS 104-110 and/or ARS 120/122 performing sensor fusion operations.

Figure 5:
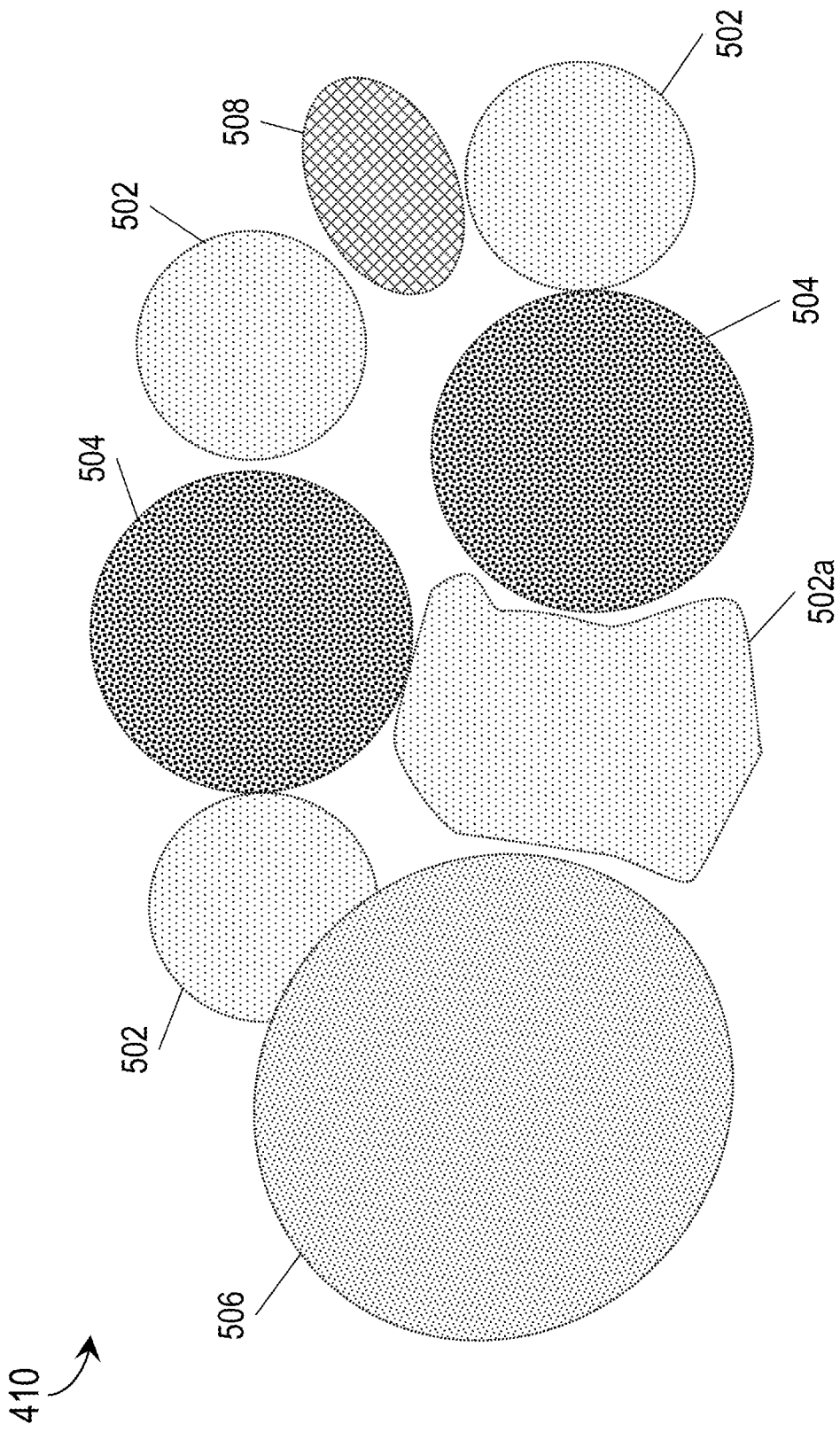
FIG. 5 is a graphical representation of a frequency heatmap generated by the server fusion operations of FIG. 4.

Referring now to FIG. 5, the heatmap 410 is disclosed.

In embodiments, the server fusion engine (FIG. 4: 402) may generate the heatmap 410 to present to the human in the loop (FIG. 4: 128) a graphic summary of how a particular assigned frequency is in use across the C2 link system at a particular time (e.g., as sensed by various component GRS (FIG. 4: 104-110) and/or ARS (FIG. 4: 120/122) of the C2 link system 100. For example, the heatmap 410 may identify areas (502) corresponding to use of the assigned frequency by the C2 link system 100 and/or its component ARS/GRS. Similarly, the heatmap 410 may identify areas (504) corresponding to use of the assigned frequency by other competing C2 link systems and/or their components.

In embodiments, the areas identified by the heatmap 410 may incorporate terrain data and may be incorporated into other geographic maps of a corresponding region. For example, the areas 502, 504 may be roughly circular, e.g., corresponding to a coverage area (FIG. 1: 112-118) or to the transmission range of a component GRS 104-110. In some embodiments, the heatmap 410 may indicate one or more regions (502*a*) to higher degrees of accuracy, e.g., based on knowledge of how the real-world terrain of the region covered by the heatmap may affect signal propagation.

In embodiments, the heatmap 410 may further identify regions 506, 508 corresponding respectively to active use of radar signals and to malicious use of the assigned frequency.

Figure 6:
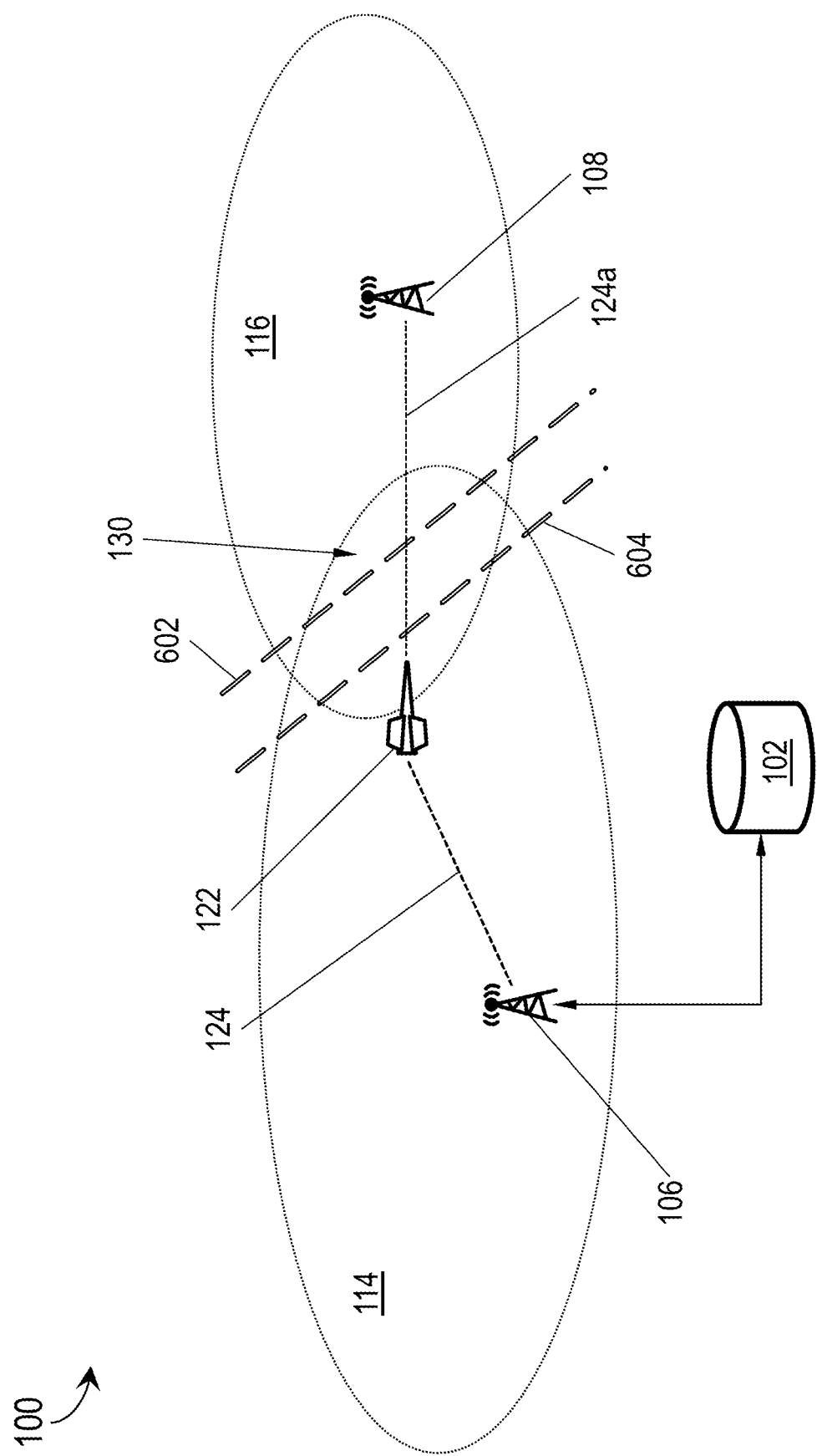
FIG. 6 is a diagrammatic illustration of UAS switchover operations generated by the server fusion operations of FIG. 4.

Referring to FIG. 6, the C2 link system 100 is disclosed.

In embodiments, the central server 102 may conclude, based on sensor fusion data received from the GRS 106 and/or further server fusion of the sensor fusion data, that the GRS 106 is currently in a congested state, e.g., the GRS may be oversubscribed in that insufficient spectrum resources have been allocated to the GRS for all of the ARS 122 operating within its coverage area 114. For example, the ARS 122 may be operating within the coverage area 114, maintaining a C2 link 124 to the GRS 106 (e.g., the C2 link 124 may be a full C2 link or a suboptimal C2 link on a C2 channel shared with another ARS). The flight plan 126 of the ARS 122 may provide for a switchover to the GRS 108 (e.g., an undersubscribed GRS) serving the adjacent coverage area 116 at a particular point 602 within the overlap region 130, where signals from both GRS 106, 108 may be sufficiently robust to support a C2 link 124.

In embodiments, the central server 102 may signal the ARS 122 (e.g., via the GRS 106) to execute a switchover at an earlier point 604 within the overlap region 130, terminating the C2 link 124 to the GRS 106 and establishing a new C2 link 124*a* to the GRS 108 in order to free up spectrum resources for the GRS 106. For example, the oversubscribed GRS 106 may have previously signaled the ARS 122 recommending a switchover, but the central server 102 may override any arbitration on the part of the ARS 122, forcing the switchover. In some embodiments, the central server 102 may not force or recommend an early switchover, e.g., if the GRS 106 is a component of a competing C2 link system.

Figure 7:
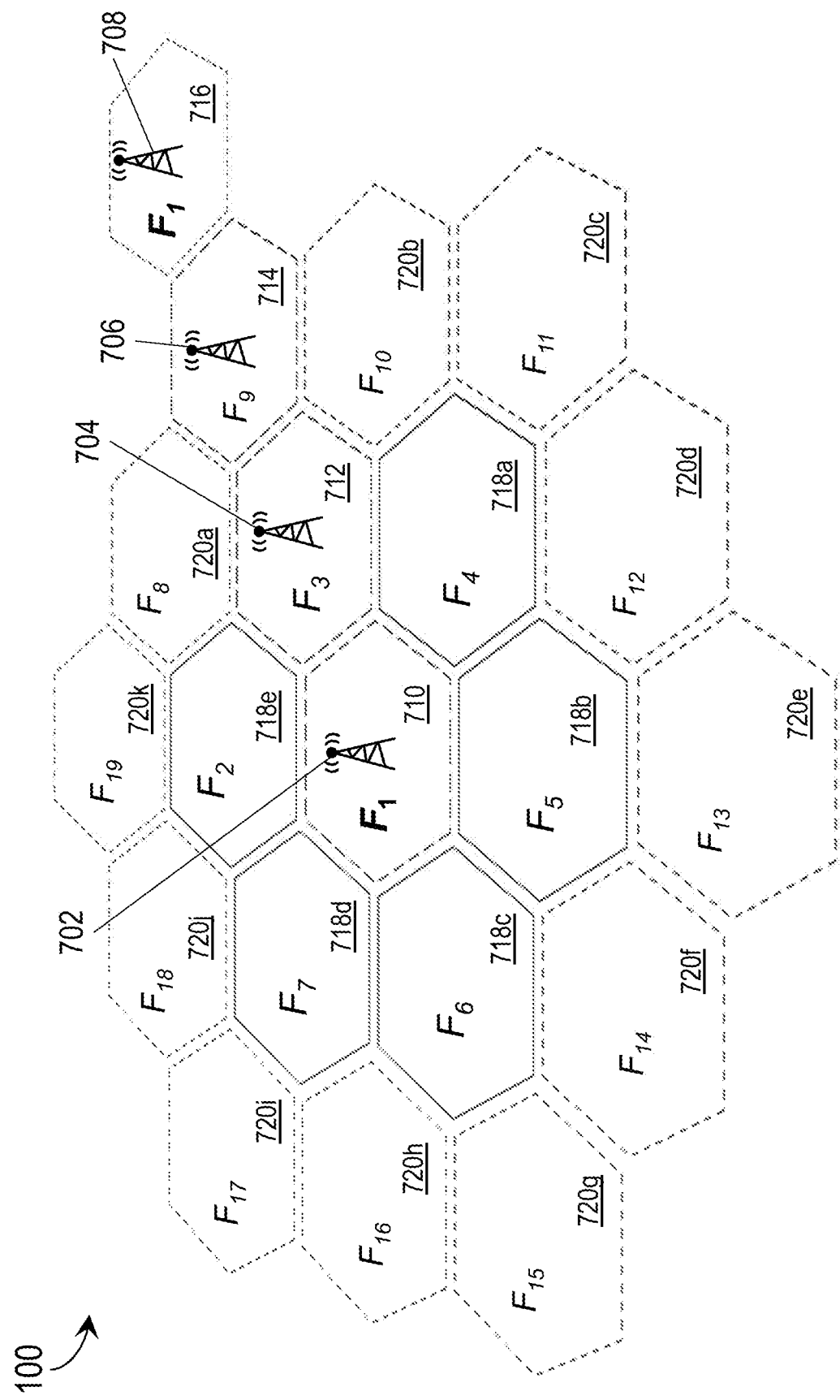
FIG. 7 is a graphical representation of spectrum allocations throughout the C2 link system of FIG. 1.

Referring to FIG. 7, the C2 link system 100 is disclosed.

In embodiments, server fusion outputs (FIG. 4: 404) may include proposed plans for reconfiguring frequency use or reuse across the C2 link system 100 and/or its component GRS 702, 704, 706, 708 and their corresponding coverage areas 710, 712, 714, 716. For example, conventional frequency use plans may observe a third-neighbor rule, in that for the GRS 702, 708 of two coverage areas 710, 716 to share an assigned frequency $F_1$, the coverage areas must be separated by at least two adjacent or neighboring coverage areas (712, 714) in order to prevent cross-channel interference on the shared frequency $F_1$ between two adjacent or proximate GRS. Under this third-neighbor rule, the GRS 702 of coverage area 710 may be assigned the frequency $F_1$ and the GRS of the six adjacent coverage areas (718*a-e*) assigned frequencies $F_2$ through $F_7$. With respect to the next ring of adjacent coverage areas (714, 720*a-k*), the third-neighbor rule precludes the reuse of the frequencies $F_2$ through $F_7$ as well as $F_1$ (e.g., as the coverage area 710 is second neighbors with the next ring of coverage areas) so twelve additional frequencies $F_8$ through $F_{19}$ must be allocated (19 frequencies in all) before $F_1$ or other allocated frequencies may be reused.

Referring to FIG. 8, a spectrum reuse plan 800 for the C2 link system 100 is disclosed.

In embodiments, server fusion outputs (FIG. 4: 404) may include proposed plans for reconfiguring frequency use or reuse across the C2 link system 100 and/or its component GRS 702, 704, 706 and their corresponding coverage areas 710, 712, 714.

In embodiments, the central server 102 may allocate frequencies throughout the C2 link system 100 based on a second-neighbor rule instead of the third-neighbor rule shown by FIG. 7. For example, the frequency $F_1$ may be assigned to the GRS 702 of the coverage area 710. Each adjacent neighboring coverage area (712, 718*a-e*) may then be assigned a different frequency ($F_2$ through $F_7$) by the central server 102 to prevent overlap and cross-channel interference. However, under the second-neighbor rule the GRS 706 of the coverage area 714 (which shares with the GRS 702 of the coverage area 710 a common adjacent/neighboring coverage area 712) may also be assigned the frequency $F_1$ as an operating frequency (e.g., as the coverage areas 710 and 714 are second neighbors). In embodiments, use of the second-neighbor rule as opposed to the third-neighbor rule may allow for the allocation of greater spectrum resources to each component GRS 702-706 of the C2 link system 100. For example, with respect to the next adjacent ring of coverage areas (714; 720*a-k*, FIG. 7), only 7 frequencies ($F_1$ through $F_7$) need be allocated (instead of 19 frequencies under the third-neighbor rule shown by FIG. 7) before frequencies may be reused.

Figure 8A:
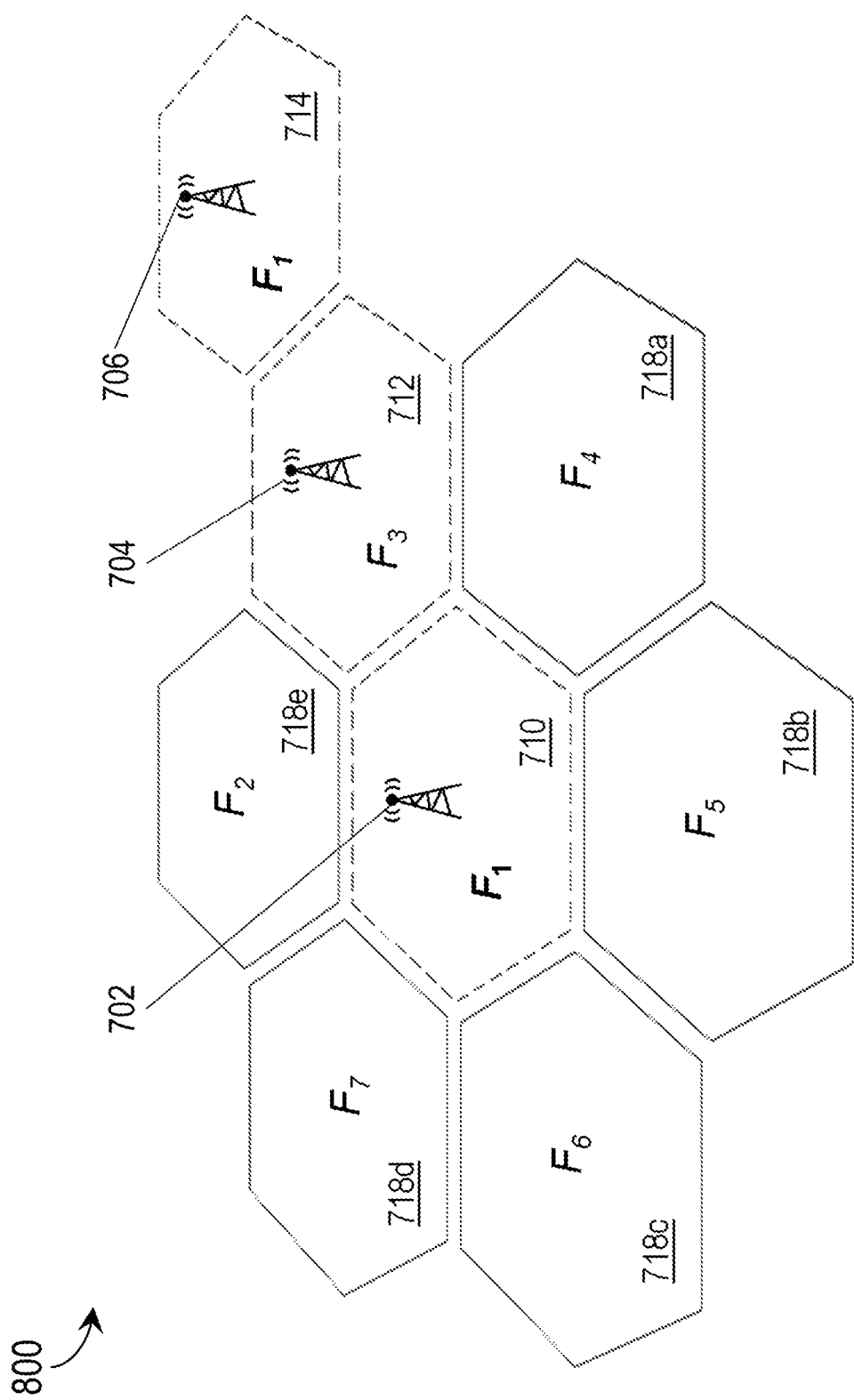
FIGS. 8A and 8B are graphical representations of spectrum reuse recommendations for the C2 link system of FIG. 1 generated by the server fusion operations of FIG. 4.
Figure 8B:
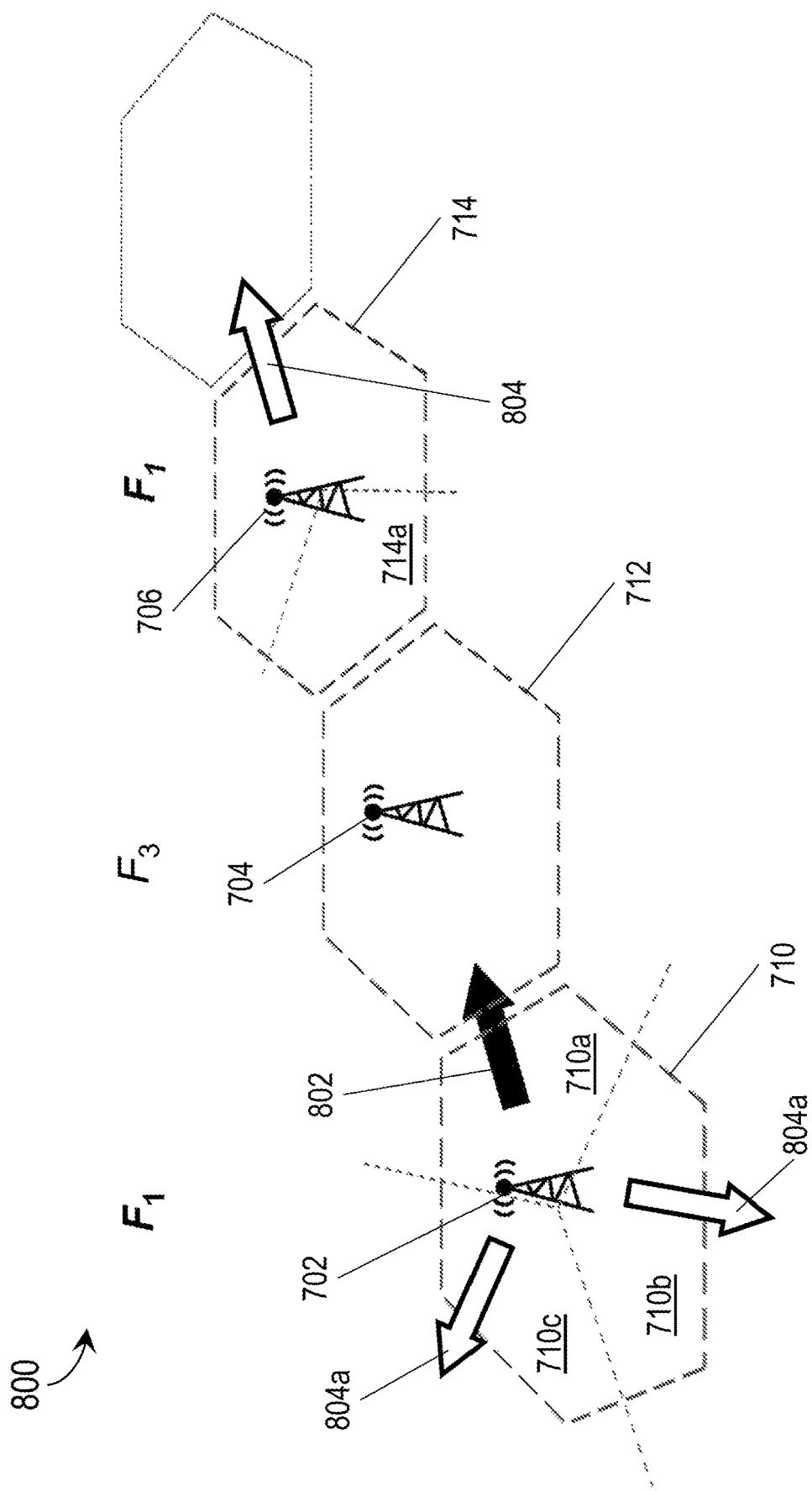

Referring also to FIG. 8B, the GRS 702-706 may be implemented and may function similarly to the GRS 104-110 of FIG. 1, except that the GRS 702-706 may incorporate time-slicing and sectored antenna elements to enable spectrum allocation according to the second-neighbor rule (as shown by FIG. 8A).

In embodiments, the GRS 702 and 706 (serving respective second-neighbor coverage areas 710, 714) may both be assigned the operating frequency $F_1$, and the GRS 704 (serving shared neighboring coverage area 712) assigned a different operating frequency $F_3$. For example, the GRS 702-706 may incorporate multiple sets of sectored antenna elements, e.g., each set within the coverage area 710 configured for transmission throughout a particular sector (710*a-b*) of the coverage area. In embodiments, the GRS 702 may avoid cross-channel interference with the GRS 706 over the shared operating frequency $F_1$ by transmitting over $F_1$ to the proximate sector 710*a* closest to the GRS 706 only during time slices 802 (e.g., time slots) when the GRS 706 is not transmitting (804) over $F_1$. For example, the GRS 702 may be at or near a busy airport while the GRS 706 may be in a rural area or, e.g., the GRS 706 may also incorporate sectored antenna elements such that the GRS 702 can transmit over $F_1$ to the adjacent sector 710*a* only when the GRS 706 is not transmitting over $F_1$ to the proximate sector 714*a* of the coverage area 714. In embodiments, the GRS 702 may transmit over $F_1$ (804*a*) during the same time slots (804) that the GRS 706 transmits over $F_1$, but only to sectors 710*b-c* not proximate to the coverage area 714 of the GRS 706.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A centralized spectrum arbitrator for a command and control (C2) communications link system, comprising:
   one or more transceivers configured to receive sensor fusion data from a sensor of a command and control (C2) link system, the sensor fusion data including at least one mean energy level corresponding to a frequency;
   one or more control processors in communication with the one or more transceivers, the control processors configured to:
     determine at least one time average of the at least one mean energy level;
     perform an interference evaluation of the corresponding frequency based on the time average and at least one threshold;
     perform a signal classification of the corresponding frequency based on the at least one mean energy level;
     and
     generate at least one fused situational awareness (SA) output based on one or more of the time average and at least one mean energy level.

2. The centralized spectrum arbitrator of claim 1, wherein the sensor is selected from:
   an air radio system (ARS) embodied in an unmanned aircraft system (UAS);
   or
   a ground radio system (GRS).

3. The centralized spectrum arbitrator of claim 1, wherein the sensor fusion data includes at least one of:
   a standard deviation from the mean energy level;
   a minimum energy level corresponding to the frequency;
   or
   a standard deviation from the minimum energy level.

4. The centralized spectrum arbitrator of claim 1, wherein the interference evaluation of the corresponding frequency is selected from:
   determining, based on the time average deceeding a low threshold, that the corresponding frequency is associated with acceptable background noise;
   determining, based on the time average exceeding the low threshold but deceeding an acceptable threshold, that the corresponding frequency is associated with an interfering signal of acceptable strength;
   or
   determining, based on the time average exceeding the acceptable threshold, that the corresponding frequency should not be used.

5. The centralized spectrum arbitrator of claim 4, wherein the C2 link system is a first C2 link system and the signal classification is selected from:
   determining that the interfering signal is a radar signal;
   determining that the interfering signal is a malicious signal;
   determining a direction of the interfering signal;
   determining an origin point of the interfering signal;
   determining that the interfering signal is associated with the C2 link system;
   or
   determining that the interfering signal is associated with a second C2 link system.

6. The centralized spectrum arbitrator of claim 5, wherein the at least one fused SA output includes an identification of a rule violation associated with one of the first C2 link system and the second C2 link system.

7. The centralized spectrum arbitrator of claim 1, wherein the at least one fused SA output includes at least one subsequent frequency to be sampled by the sensor.

8. The centralized spectrum arbitrator of claim 1, further comprising:
   at least one interactive display device configured to:
   present the at least one fused SA output to at least one human operator;
   and
   accept control input from the human operator based on the at least one presented fused SA output.

9. The centralized spectrum arbitrator of claim 1, wherein the at least one fused SA output includes a graphic representation of the at least one corresponding frequency.

10. The centralized spectrum arbitrator of claim 1, wherein the at least one corresponding frequency includes a frequency sub-band.

11. The centralized spectrum arbitrator of claim 1, wherein the at least one fused SA output includes at least one dynamic spectrum access (DSA) operation.

12. The centralized spectrum arbitrator of claim 11, wherein the at least one DSA operation includes:
    directing at least one ARS of the C2 link system, the ARS configured for maintaining a first C2 link with a first GRS, to establish a second C2 link with a second GRS.

13. The centralized spectrum arbitrator of claim 11, wherein:
    the C2 link system comprises a plurality of GRS, each GRS associated with one or more operating frequencies;
    and
    the at least one DSA operation includes at least one spectrum reuse reallocation of the one or more pluralities of operating frequencies among the plurality of GRS.

14. The centralized spectrum arbitrator of claim 13, wherein the at least one spectrum reuse reallocation includes:
    allocation of at least one shared operating frequency to 1) a first GRS associated with a first coverage area and 2) a second GRS associated with a second coverage area not adjacent to the first coverage area, the first coverage area and the second coverage area commonly adjacent to a third coverage area.

15. The centralized spectrum arbitrator of claim 14, wherein the at least one spectrum reuse reallocation provides for:

use of the at least one shared operating frequency by the first GRS corresponding to at least one of a first time slot and a first direction; and
use of the at least one shared operating frequency by the second GRS corresponding to at least one of a second time slot and a second direction.

\* \* \* \* \*